Dec. 8, 1925.

C. M. STANTON

SIFTER

Filed Oct. 13, 1922

1,564,638

Inventor
Charlotte M. Stanton
by Orwig & Hague, Att'ys

Patented Dec. 8, 1925.

1,564,638

UNITED STATES PATENT OFFICE.

CHARLOTTE M. STANTON, OF DES MOINES, IOWA; BARCLAY STANTON ADMINISTRATOR OF THE SAID CHARLOTTE M. STANTON, DECEASED.

SIFTER.

Application filed October 13, 1922. Serial No. 594,251.

*To all whom it may concern:*

Be it known that I, CHARLOTTE M. STANTON, a citizen of the United States, and a resident of Des Moines, in the county of Polk, State of Iowa, have invented a certain new and useful Sifter, of which the following is a specification.

The object of my invention is to provide a sifter of simple, durable and inexpensive construction especially designed for use in the treatment of flour in preparing same for use in cake baking and the like, where it is desirable to repeatedly pass flour through a fine sieve in order to thoroughly and completely separate the particles of flour from each other and leave the flour, after going through the sifting process, in a light fluffy condition with all of the particles thoroughly separated.

More specifically it is my object to provide a device of this class in which a number of sieves and the supports therefor may all be made of wire screen, thereby producing a device of extremely simple and inexpensive construction.

Further it is my object to provide a device of this class in which the screens may be bodily removed from the container or replaced therein.

A further object is to provide a device of this class in which a certain quantity of flour may be placed in the top of the receptacle, and then all of the flour may be made to pass through the various sieves, and all of it collected and retained within the space between, whereupon the receptacle may be inverted and all of the flour be made to again pass through the same set of sieves and discharged at the open end of the receptacle so that the flour may be subjected to a comparatively great number of sifting processes in a minimum of time with small effort and without danger of spilling the flour and without the necessity of using any other receptacle than that in which the sieves are mounted.

My invention consists in the construction, arrangement and combination of the various parts of the device, whereby the objects contemplated are attained, as hereinafter more fully set forth, pointed out in my claims, and illustrated in the accompanying drawings, in which:

Figure 2:
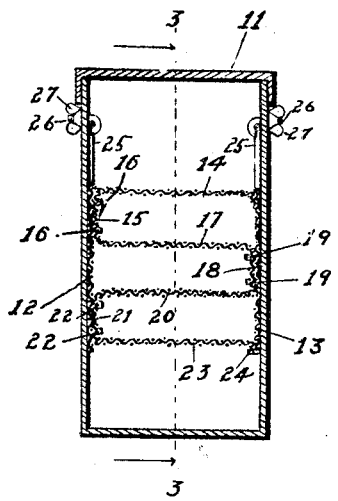
Figure 2 shows a vertical, transverse, sectional view of the same.
Figure 4:
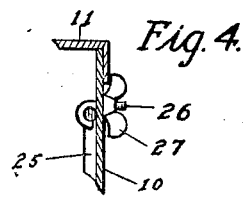
Figure 4 shows an enlarged detail, sectional view illustrating the means for adjustably clamping the sieves within the receptacle.
Figure 1:
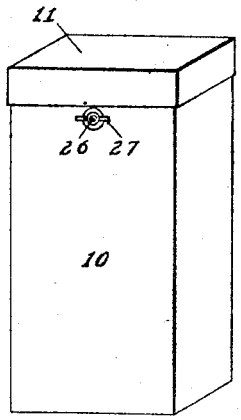
Figure 1 shows an isometric view of a flour sifter embodying my invention.
Figure 3:
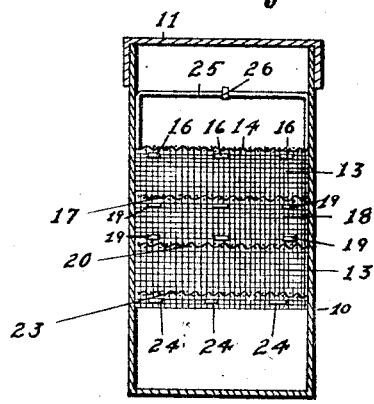
Figure 3 shows a vertical, transverse view of the same on the line 3—3 of Figure 2.

Referring to the accompanying drawings I have used the reference numeral 10 to indicate the body portion of the receptacle which is preferably rectangular in cross section and open at the top and closed at the bottom.

I find it advantageous to make this receptacle of fiber board, though, of course, other materials may be employed.

A cover 11 is provided which may be fitted over the upper end of the receptacle. The screens are preferably constructed as follows:

I first provide a flat piece of woven wire screen 12 of a size to fit into and against the inner edge of one side of the receptacle. I then provide a long narrow strip of woven wire screen, and commencing at the top end marked 13 this screen extends upwardly to a distance corresponding to the length of the screen 12. It is then extended horizontally at 14, then downwardly a short distance at 15, and this downwardly extended portion is permanently united to the part 12 by staples 16 or the like. Then at the point marked 17 the screen is again extended horizontally until it meets the part 13, and then downwardly at 18 a short distance and at this point it is connected by staples 19 to the part 13. It is then extended horizontally at 20 and then downwardly at 21 where it is united by staples 22 to the part 12. It is again extended horizontally at 23 and its end is united by staples 24 to the lower end of the part 13.

Two wire bails or handles 25 are provided, each of which has its ends united to the screen preferably by solder and its central portion extends horizontally across the interior of the receptacle and hooks 26 are provided to engage the bail and extend through the receptacle, and wing nuts 27 are provided on the outer ends of the hooks whereby the bails may be clamped to the receptacle and readily and easily detached therefrom.

In practical operation the screens are formed and united in the manner described, and then they are set down loosely inside of the receptacle and finally detachably secured by the hooks 26, then the device is ready for operation.

In using a quantity of flour it is placed on top of the receptacle and then on top of the upper screen, and then if desired a cover may be applied and the operator shakes the receptacle until all of the flour passes through the four screens and is collected in the space below the lower screen within the receptacle. Then if desired, the operator may remove the detachable cover and invert the receptacle, and again shake it until all of the flour travels again through the same four screens, and is discharged from the open top of the receptacle into the vessel where it is to be used for cake baking or the like.

In the event that anything should become lodged between the several screens, then the operator may release the wing nuts 27, unhook the bails and use the bails 25 to remove the screens, whereupon they may be readily and easily cleaned and replaced.

In practice I have found that in preparing flour for cake baking or the like, I may, with my improved sifter, subject the flour to eight sifting operations in substantially the same time as has been employed heretofore in subjecting it to a single operation, but in addition to this I do not need any other receptacle or vessel than the one forming the receptacle for my sifter, because after the flour has gone through four screens it is all collected within the receptacle, then by inverting the receptacle it is discharged out of the open end thereof, so that a great economy is effected in the amount of time necessary to complete the first operation and the number of vessels and receptacles required to hold the flour during such repeated sifting operations,

I claim as my invention:

1. An improved sifter comprising a receptacle, two screen supports each formed of wire netting and designed to be inserted in the receptacle on opposite sides thereof, means for detachably securing them to the receptacle, and a series of screens formed completely of a single piece of screen wire netting attached at one end to one of the screen supports, extended across the receptacle and attached to the other screen support, and then extended downwardly a short distance and then again across the receptacle to the first screen support and attached thereto, and so on throughout its entire length, substantially as and for the purposes stated.

2. In a sifter, the combination of a suitable receptacle, a sieve, a supporting frame therefor formed complete of wire netting comprising two side members and a series of screen members extended from one of the side members to the other and spaced apart from each other, and means for securing the screen members to the frame member to thereby form a sieve device consisting of a complete unit which may be placed in or removed from the receptacle shaped to receive and fit it.

3. In a sifter, the combination of a suitable receptacle, a sieve, a supporting frame therefor formed complete of wire netting comprising two side members and a series of screen members extended from one of the side members to the other and spaced apart from each other, means for securing the screen members to the frame member to thereby form a sieve device consisting of a complete unit which may be placed in or removed from the receptacle shaped to receive and fit it, one or more bails fixed to the screen and extended upwardly, and means for detachably securing the bails in position within the receptacle.

Des Moines, Iowa, July 31, 1922.

CHARLOTTE M. STANTON.